United States Patent [19]

Duh

[11] Patent Number: 5,750,644

[45] Date of Patent: May 12, 1998

[54] PROCESS FOR THE CRYSTALLIZATION OF POLYETHYLENE NAPHTHALATE PREPOLYMERS AND THE SOLID STATING OF THOSE CRYSTALLIZED PREPOLYMERS

[75] Inventor: Ben Duh, Tallmadge, Ohio

[73] Assignee: Shell Oil Company, Houston, Tex.

[21] Appl. No.: 740,547

[22] Filed: Oct. 30, 1996

[51] Int. Cl.$^6$ ................................. C08F 6/00; C08J 3/00
[52] U.S. Cl. .................. 528/481; 528/298; 528/492; 528/503
[58] Field of Search ...................... 528/298, 481, 528/492, 503

[56] References Cited

U.S. PATENT DOCUMENTS

| | | |
|---|---|---|
| 3,718,621 | 2/1973 | Wilson . |
| 4,150,079 | 4/1979 | Chang . |
| 4,755,587 | 7/1988 | Rinehart . |
| 4,849,497 | 7/1989 | Scannapieco . |
| 4,917,845 | 4/1990 | Cohn . |
| 4,957,945 | 9/1990 | Cohn . |
| 4,963,644 | 10/1990 | Duh . |
| 4,977,196 | 12/1990 | Scannapieco . |
| 4,992,619 | 2/1991 | Koide et al. . |
| 5,194,572 | 3/1993 | Mossman . |
| 5,225,448 | 7/1993 | Maier et al. . |
| 5,290,913 | 3/1994 | McAllister et al. ............... 528/483 |
| 5,532,335 | 7/1996 | Kimball et al. ................... 528/495 |

*Primary Examiner*—Samuel A. Acquah
*Attorney, Agent, or Firm*—Kim Muller

[57] ABSTRACT

A process is disclosed for the crystallization of a PEN prepolymer containing volatile components. The temperature is maintained at a temperature in the range of about 20° C. above the Tg and about 10° C. below the Tm while the PEN prepolymer is agitated. The PEN prepolymer is present as chips or pellets. The pressure during crystallization is maintained at a level higher than the vapor pressure of the volatile components in the PEN prepolymer chips or pellets.

24 Claims, No Drawings

PROCESS FOR THE CRYSTALLIZATION OF POLYETHYLENE NAPHTHALATE PREPOLYMERS AND THE SOLID STATING OF THOSE CRYSTALLIZED PREPOLYMERS

FIELD OF THE INVENTION

The field of this invention relates to the manufacture of polyethylene naphthalate polymers and copolymers thereof. This invention is concerned with the crystallization of polyethylene naphthalate prepolymers and with the solid stating of the crystallized polyethylene naphthalate prepolymers.

BACKGROUND OF THE INVENTION

Higher molecular weight polyesters are commonly produced from lower molecular weight polyesters of the same composition by solid state polymerization. The lower molecular weight polyesters which are used in such solid state polymerizations are generally prepared by conventional melt polymerization reactions. These are sometimes referred to as prepolymers. Solid state polymerization of prepolymers is generally considered advantageous in that the handling of high molecular weight ultra-high viscosity molten polymers during the polymerization phase is eliminated. Thermal degradation is also essentially avoided during the solid state portion of the polymerization of the prepolymers.

The lower molecular weight polyester prepolymers utilized in solid state polymerizations are generally in the form of pellets or chips. Such pellets can vary greatly in size; however, as a general rule, the smaller the size of the pellets of polyester prepolymer, the faster the solid state polymerization will proceed. Very fast rates of solid state polymerization can be attained by utilizing polyester prepolymers which are in the form of porous pills as described in U.S. Pat. No. 4,755,587 to Rinehart.

Most thermoplastic polyesters, including polyethylene terephthalate (PET) and polyethylene naphthalate (PEN), produced by melt-phase polymerization are almost completely amorphous in nature. Such amorphous polyester polymers which are prepared by melt polymerization are normally converted from the amorphous state to the crystalline state prior to solid state polymerization to raise their sticking temperature. This is done to keep pellets or chips of the polyester prepolymer being solid state polymerized from sticking together as a solid mass.

When an amorphous polyester is heated from ambient temperature to above its glass transition temperature (Tg), it will become soft and sticky before it starts to crystallize. The sticking temperature of an amorphous polyester is usually about 20° C. above its Tg. The crystallization rate of the polyester will not be fast enough to be practical until its temperature is further raised to about 30° C. above its sticking temperature. To achieve the maximum crystallization rate, the temperature of the polyester must be raised even higher. For example, PET has a Tg of 74° C. and a sticking temperature of about 95° C. The crystallization rate of PET is rather low until the temperature is raised to above 125° C. and in practice, PET is usually crystallized at temperatures between 150° C. and 190° C.

PEN is a relatively new and different polyester with promising properties for fiber and packaging applications. PET and PEN behave differently during crystallization as a result of their different physical and chemical properties. PEN has a Tg of about 120° C. and a crystalline melting point (Tm) of about 270° C. It exhibits a crystallization peak between 180° C. and 220° C. Its sticking temperature is about 140° C. to 150° C. when it is in the amorphous state. According to conventional wisdom, the best crystallization temperature range for PEN is between 180° C. and 220° C.

In the crystallization process, the polyester undergoes a sticky stage. This takes place in the period between the time the polyester temperature exceeds the sticking temperature and the time the polyester becomes well crystallized. Therefore, most commercial-scale crystallizers for continuous crystallization of polyesters must provide vigorous agitation to prevent agglomeration or lumping of the polyester pellets. Two types of continuous crystallizers have been widely used, namely, agitated vessels and fluidized beds.

Heretofore, in the continuous crystallization process of particulate polyesters, PET in particular, the polyester pellets at ambient temperature without any pretreatment are directly charged into a crystallizer in which the heat transfer medium (e.g., hot air, hot nitrogen, or indirect hot oil contact) maintains a suitable crystallization temperature. Under appropriate operating conditions, the polyester pellets can be crystallized without lumping or agglomeration.

However, it has been determined by this inventor that when PEN pellets are exposed to the required crystallization conditions, the pellets undergo a sudden and rapid expansion as they are heated to near the crystallization temperature. This results in a puffed up skin of most of the pellets which become very sticky, and, within seconds, agglomerate tightly into big lumps, vigorous agitation notwithstanding. This indicates that the conventional commercial crystallization process used for PET is not suitable for commercial crystallization of PEN.

In Duh, U.S. Pat. No. 4,963,644, issued in October 1990, polyethylene naphthalate prepolymer is devolitalized at a temperature of 80° C. to 140° C. prior to crystallization to remove the volatile components of the prepolymer. This avoids the sudden volatilization of the volatile components contained in the pellets during crystallization, thereby avoiding deforming or puffing of the resultant prepolymer pellets. This deformation, if it takes place, resembles the formation of "popcorn" of the pellets and virtually destroys the ability to solid state these pellets into higher molecular weight polymers useful as resins for films or packaging materials.

This invention herein resides in the discovery that PEN pellets may be crystallized at a positive pressure at least as high, or higher than, the vapor pressure of the volatile components contained in PEN pellets and thereby deformation of the PEN pellets, during crystallization, is avoided.

SUMMARY OF THE INVENTION

Polyethlyene naphthalate resins can be made with desired molecular weight from melt phase polymers, referred to herein as prepolymers, by first crystallizing the prepolymer formed in the melt phase and then solid stating the crystallized prepolymer at conditions of elevated temperature over a period of time sufficient to build the desired molecular weight. The melt phase prepolymer however adsorbs moisture during pelletizing and from the atmosphere at ambient conditions. The moisture or water content of the prepolymer constitutes the major volatile component which must be accounted for during the heat up of the pellets during crystallization.

The invention described and claimed herein comprises crystallizing the prepolymer under higher than atmospheric pressures wherein the pressure existing during crystallization is at least equal to, or greater than, the vapor pressure of the volatile components contained in the PEN prepolymer. The pressure during crystallization is positive (with respect to atmospheric pressure). The amount of pressure necessary should be equal to the pressure which would be released in the event the prepolymer is heated under vacuum or at atmospheric pressure without first devolitalizing the prepolymer. In accordance with this invention, the prepolymer may be crystallized, without or with partial devolitization, and without the sudden expansion of the volatile water content of the prepolymer which deforms the pellets prior to drying and solid stating or other processing steps for the crystallized prepolymer.

The crystallization herein occurs at a pressure at least equal to, or greater than, the vapor pressure of the volatile components contained in the PEN prepolymer. The exact empirical pressure necessary will vary with the volatile content of the prepolymer. Where the moisture or volatile content is less than about 0.06% water, visible or apparent deformation of the prepolymer will not occur even if the prepolymer is crystallized at ambient pressure conditions. However, as the water content increases, the necessary crystallization pressure to avoid deformation of the prepolymer must correspondingly increase. As the water content in the pellet approaches equilibrium with the water content of the atmosphere, the crystallization pressure will reach a maximum necessary to avoid deformation of the prepolymer pellet. It is possible that the positive pressure may be as high as 70 psig to avoid pellet deformation but usually pressures of between 10 psig and 40 psig will be sufficient to avoid deformation of the pellet. It is understood herein that a measurement of 0 psig is equal to one atmosphere or approximately 14.7 psi at sea level.

DETAILED DESCRIPTION OF THE INVENTION

The polyethylene naphthalate (PEN) prepolymer utilized in accordance with the present invention is typically prepared by standard melt polymerization techniques. Such melt polymerizations result in the formation of PEN which is essentially totally amorphous in nature although it may contain small regions where crystallinity exists. The PEN is generally produced by melt polymerization using ethylene glycol and a naphthalate dicarboxylic acid, such as 2,6-naphthalene dicarboxylic acid, as monomers. However, it is also possible to prepare PEN prepolymer by polymerizing ethylene glycol with an ester of 2,6-naphthalene dicarboxylic acid. It is also contemplated that other diols and diacids may be present to modify the PEN.

The PEN prepolymer utilized in accordance with this invention typically has an initial starting intrinsic viscosity (IV) of at least about 0.2 dl/g as measured in a 60:40 phenol:tetrachloroethane solvent system at a temperature of 30° C. The amorphous PEN prepolymer will more preferably have an initial or starting IV of from about 0.3 to about 0.7 dl/g. The amorphous PEN prepolymer will more preferably have an initial IV of about 0.4 to about 0.5 dl/g.

The crystallization of the prepolymer is performed in a continuous process, or in a batch process, in vessels that are sometimes referred to as tumbler-dryers. The preferred process is the continuous process where the crystallization is performed in a fluidized bed or in an agitated vessel. It is necessary that the amount of agitation be sufficient so as to avoid the pellets sticking to one another.

The pressure in the crystallization zone must be equal to, or greater than the vapor pressure of the volatiles inside the prepolymer pellet. While the water content is generally referred to herein as the volatile components of interest, it is also contemplated that small amounts of other chemicals may add to the volatile content, such as acetaldehyde and ethylene glycol.

The pressure in the crystallization zone can be accorded by the presence of a gas atmosphere which may comprise air, nitrogen or mixtures thereof. Other gases may also be present. Any gases which are present should not be reactive to the prepolymer to the extent that they have a deleterious effect upon the ultimate polymer. The preferred gases are exemplified by air, nitrogen, argon, helium and the like. These gases may be heated prior to entry to the crystallization zone. The equipment used for the crystallization should be rated for whatever positive pressure is anticipated by the volatile content of the PEN prepolymer.

The temperature of the prepolymer during crystallization will be within the range of about 20° C. above the Tg (glass transition temperature) to 10° C. below the Tm (melting point) of the of prepolymer.

If beneficial, the prepolymer may be partially devolitalized by heating at a temperature between 80° C. and 140° C. to remove some of the volatiles from the prepolymer prior to the positive pressure crystallization practiced herein. When these volatiles in the prepolymer are partially removed, a relatively lower positive pressure will be needed to prevent the remaining volatiles from expanding during crystallization and thereby deforming the pellets.

The amount of time required for the crystallization step will depend upon the temperatures utilized. Higher temperatures naturally require shorter periods of time to achieve the requisite degrees of crystallization. For example, at a temperature of 150° C., the time required for crystallization is about 30 minutes to 1 hour. At a temperature of 200° C. only about a few minutes are required for crystallization. The optimum period of time required for crystallization will also be somewhat dependent upon the equipment utilized and the size and shape of the pellets or chips. The time required for crystallization in a continuous process will typically be within the range of 5 minutes to 30 minutes and will more typically be within the range of about 7 minutes to about 20 minutes.

The polymer or prepolymer can be a homopolymer of PEN or a copolymer of PEN. It is preferred that the copolymer of PEN be a copolymer of PEN and polyethylene terephthalate (PET). The percentage of PEN and PET in the copolymer can vary but will usually range from 90% PEN to 10% PEN to 10% PET to 90% PET and preferably from 98% PEN to 2% PEN to 2% PET to 98% PET. While any of these percentages are within the scope of this invention, it is most preferred that the content of PEN in the copolymer be greater than 80% and most preferred that the PEN content be greater than 90%.

After the PEN prepolymer has been crystallized, it can be dried and solid state polymerized in a batch or continuous process. Suitable solid state polymerization temperatures can range from a temperature just above the threshold temperature of the polymerization reaction up to a temperature within a few degrees of the sticking temperature of the PEN prepolymer, which is well below its melting point.

The solid state polymerization temperature utilized will typically be from about 1° C. to about 50° C. below the sticking temperature of the crystallized PEN prepolymer. The optimum solid state reaction temperature will differ somewhat for prepolymers of different molecular weights. As a general rule, the optimum solid state polymerization temperature for the homopolymer PEN prepolymer will be from about 5° C. to about 20° C. below its sticking temperature.

For example, in the solid state polymerization of crystalline PEN, the temperature employed normally ranges from about 210° C. to about 265° C. Generally, the crystalline PEN prepolymer will be solid state polymerized at a temperature of from about 230° C. to about 265° C. In most cases, PEN prepolymer will be solid state polymerized at a temperature of from 240° C. to 260° C.

As the solid state polymerization of PEN prepolymer proceeds, its sticking temperature increases. Thus, the solid state polymerization temperature can be incrementally increased during the course of the polymerization. For example, U.S. Pat. No. 3,718,621 describes such a technique in the solid state polymerization of PET prepolymer.

The solid state polymerization is conducted in the presence of a stream of an inert gas or under a vacuum. Normally, in a continuous process, solid state polymerization is conducted in the presence of an inert gas stream. It is highly desirable for the inert gas to flow uniformly throughout the solid state polymerization zone which is filled with the crystallized polyester prepolymer which is being polymerized. In order to help insure that the inert gas flows homogeneously or uniformly through the solid state polymerization zone without bypassing certain areas in it, a device for dispersing the inert gas is generally used. Thus, a good polymerization reactor will be designed in such a way that the inert gas will flow homogeneously through the polyester prepolymer in it. It should be noted that the inert gas actually flows around the pellets or chips of polyester prepolymer as it streams through the solid state polymerization zone.

Some suitable inert gases for use in the solid state polymerization process of this invention include nitrogen, carbon dioxide, helium, argon, neon, krypton, xeon, and certain industrial waste gases. Various combinations or mixtures of different inert gases can also be used. In most cases nitrogen will be used as the inert gas. In a continuous process, the mass flow ratio of PEN prepolymer to nitrogen gas will be within the range of about 1:0.25 to about 1:1.

The continuous solid state polymerization reactor employed can comprise a fluidized bed or a moving bed. In most cases, it is preferred to utilize a cylindrical polymerization reactor wherein the PEN prepolymer flows through the reactor for the desired residence time. Such cylindrical reactors have a substantially uniform cross-section and a sufficient height to allow the PEN prepolymer to flow by reason of the force of gravity from the top to the bottom of the reactor in the desired residence time. In other words, the PEN prepolymer moves from the top to the bottom of such a cylindrical polymerization reactor in a partially dammed stated. The rate of flow through such a reactor can be controlled by regulating discharge at the bottom of the reactor. It is generally preferred to allow an inert gas to flow countercurrently (upwardly) through the reactor at a gas velocity well below the turbulence point so that the pellets or chips of PEN prepolymer are not fluidized (always remain in contact with each other). The pellets or chips of PEN prepolymer remain in substantially the same physical form throughout the solid state polymerization process.

The PEN prepolymer will be solid state polymerized for a time sufficient to increase its molecular weight or IV to that of the high molecular weight PEN resin desired. It will be desirable for the high molecular weight PEN resin being prepared to have an IV of at least 0.5 dl/g. In most cases the high molecular weight resin will have an IV of at least about 0.65 dl/g and for some applications will preferably have an IV of at least about 0.8 dl/g. The polymerization time needed will normally range from about 1 to about 36 hours and in most cases will range from 6 to 24 hours.

EXAMPLES

This invention is illustrated by the following examples which are given merely for the purpose of illustration and are not to be regarded as limiting the scope of the invention or the manner in which it can be practiced. Unless specifically indicated otherwise all parts and percentages are given by weight.

Example 1

A crystallization vessel was used in the following examples. It was fabricated with a 10" long ½" schedule 40 stainless steel pipe having an OD of 0.840" and an ID of 0.622". The crystallizer was fitted with a thermocouple, a pressure gauge and a needle valve. The tip of the thermocouple extended to about 1 inch above the bottom of the vessel so that it contacted the polymer sample during the experimental runs. The valve was used to pressurize and vent the vessel and provided control of the pressure in the vessel. All experimental pressures were recorded in psig such that 0 psig was equal to 1 atmosphere. Whenever atmospheric crystallization was attempted the valve was left open during crystallization. When above 0 psig was desired the crystallizer was pressurized with compressed air before the crystallization was started. As the pressure inside the crystallizer increased due to an increase in the temperature, the gas or vapor was released from the vessel by adjusting the valve to obtained the desired and reported pressure.

Two polyethylene naphthalate prepolymers were used in the experiments summarized in Table 1. Polymer A was a PEN homopolymer having an IV of 0.475 dl/g, a DSC melting point Tm of 270° C., a glass transition temperature Tg of 120° C., a pellet size of 2.00 g/100, a moisture content of 0.538% and an acetaldehyde content of 83 ppm. Polymer B was a 95% PEN/5% PET copolymer based on mole % of repeat units. It possessed an IV of 0.453 dl/g, a Tm of 262° C., a Tg of 118° C., a pellet size of 2.01 g/100, a moisture content of 0.470% and an acetaldehyde content of 75 ppm. For both tested polymers the IV was measured in a 60/40 phenol/tetrachloroethane solvent at 30° C.

In runs 1–21, in Table 1, the crystallization was conducted in the presence of air. Five (5) grams of the respective polymer was charged into the crystallizer and pressurized where the run called for a pressure greater than 0 psig. The crystallizer was immersed in a thermostated diethylene glycol (DEG) bath and the temperature controlled as desired and shown in Table 1. The time when the polymer/air temperature reached within 1° C. of the targeted crystallization temperature was considered to be time zero. The crystallization was permitted to continue for the desired period of crystallization time. The heat up time to arrive at crystallization temperature was about 8 minutes. The crystallizer was removed from the DEG bath and immediately quenched in cold water to stop crystallization. The vessel was opened and the crystallized polymer was tested for density via a density measurement column and is reported as set forth in Table 1. Table 1 further shows the crystallization conditions and pellet appearances.

TABLE 1

Crystallization Conditions and Results

| Run No. | Polymer | Medium | Temp. deg. C. | Pressure psig | Time min. | Density g/cc | Color | Pellet Appearance |
|---|---|---|---|---|---|---|---|---|
| 1 | A | Air | 170 | 0 | 5 | <1 | White | Polymer greatly expanded and formed a porous mass. |
| 2 | A | Air | 170 | 10 | 5 | <1 | White | Puffed up, pearl-like pellets |
| 3 | A | Air | 170 | 15 | 5 | >1, <1.1 | White | Bulged pellets |
| 4 | A | Air | 170 | 20 | 5 | 1.257 | White | Slightly deformed pellets |
| 5 | A | Air | 170 | 25 | 5 | 1.347 | White | Normal |
| 6 | A | Air | 170 | 30 | 5 | 1.347 | White | Normal |
| 7 | A | Air | 170 | 30 | 3 | 1.347 | White | Normal |
| 8 | A | Air | 170 | 30 | 10 | 1.348 | White | Normal |
| 9 | A | Air | 180 | 30 | 1 | 1.348 | White | Normal |
| 10 | A | Air | 180 | 30 | 5 | 1.348 | White | Normal |
| 11 | A | Air | 160 | 30 | 5 | 1.333 | Opaque | Normal |
| 12 | A | Air | 160 | 30 | 10 | 1.342 | White | Normal |
| 13 | A | Air | 150 | 30 | 30 | 1.328 | Translucent | Normal |
| 14 | A | Air | 140 | 30 | 60 | 1.327 | Clear | Amorphous, normal shape |
| 15 | B | Air | 170 | 0 | 5 | <1 | White | Pellets greatly expanded and formed a porous mass |
| 16 | B | Air | 170 | 15 | 5 | 1.217 | White | Slightly expanded and deformed |
| 17 | B | Air | 170 | 20 | 5 | 1.315 | White | Normal |
| 18 | B | Air | 170 | 25 | 5 | 1.347 | White | Normal |
| 19 | B | Air | 170 | 25 | 3 | 1.344 | White | Normal |
| 20 | B | Air | 170 | 30 | 5 | 1.344 | White | Normal |
| 21 | B | Air | 170 | 25 | 10 | 1.347 | White | Normal |

Density can be used to estimate the degree of crystallinity of a polyester provided the polyester mass does not contain voids. Thus, the degree of crystallinity of PEN can be related to its density by the following equation:

$$\text{Fractional crystallinity} = (D_s - D_a)/(D_c - D_a)$$

where $D_s$=density of test sample (g/cc), $D_a$=density of amorphous PEN sample=1.328 g/cc, and $D_c$=density of PEN Crystal=1.407 g/cc. However, if the polymer expands significantly, the relationship of Equation (1) no longer holds. Therefore, the colors of the crystallization products (i.e., clear, hazy, translucent, opaque, or white), were included in Table 1 to serve as an alternate indicator for crystallinity. As an amorphous polyester crystallizes, it changes from clear to hazy, translucent, opaque, and white. In general, an opaque PEN or copolymer should have a sufficient crystallinity to prevent sticking in a hopper dryer.

In Run 1, crystallization was conducted at 170° C. under atmospheric pressure (0 psig). As expected, the polymer greatly expanded to form a porous mass. As the crystallization pressure was increased (Runs 2, 3, and 4), the extent of expansion and lumping or sintering of the pellets decreased. When the crystallization pressure was increased to about 25 psig or higher (compare Runs 5 through 8), no significant polymer expansion was observed and crystallized pellets with normal shape were obtained. Although there was still some degree of clumping or agglomeration of pellets in those runs with crystallization pressure of 25 psig or higher, this was expected because there was no agitation during the crystallization run. In the commercial operation, the crystallizer used always provides adequate agitation or forced motion that will prevent pellet lumping as long as the pellets do not expand significantly during crystallization. This demonstrates that, according to the process of this invention, with a sufficiently high pressure in the crystallizer, untreated PEN pellets can be crystallized without pellet expansion or puffing.

When the crystallization temperature was raised to 180° C. with crystallization pressure fixed at 30 psig (Runs 9 and 10), well crystallized pellets with higher density (or crystallinity) and normal shape were obtained. When the crystallization temperature was lowered to 160° C. with crystallization pressure fixed at 30 psig (Runs 11 and 12), crystallized pellets with lower density and normal shape were obtained. When the crystallization temperature was lowered to 150° C. (Run 13), translucent pellets with normal shape were obtained after 30 minutes of crystallization. When the crystallization was further lowered to 140° C. (Run 14), pellets remained amorphous even after 60 minutes of crystallization. These observations indicate that the rate of crystallization and attainable degree of crystallinity of PEN increases with increasing temperature.

In Runs 15 through 21, Polymer B was crystallized in air under various pressures. It can be seen that this naphthalate-containing copolyester behaved similarly to PEN homopolymer (Polymer A) under similar conditions. At a crystallization temperature of 170° C. and a crystallization pressure of 20 psig (Run 17), well crystallized pellets with normal shape were obtained. Although no visible expansion of pellets was observed, the density of the crystallized pellets (1.315 g/cc) was lower than that of the amorphous polymer (1.328 g/cc). This indicates that under a crystallization pressure of 20 psig, there was still some small degree of expansion although the crystallized pellet shape appeared to be normal. Since the crystallized pellet shape appeared normal and there was no excessive pellet lumping during crystallization, these crystallization pressures are considered acceptable. Clearly, when the crystallization pressure was raised to 25 psig and above, well crystallized pellets with no expansion were obtained.

Example 2

Each of the prepolymers crystallized in runs 5–12 was dried to a moisture content of 0.005% without any observation of pellet expansion. The crystallized prepolymer of run 13 resulted in slight lumping because of the insufficient degree of crystallinity. This was predicted from the translucent color observed with the crystallization product. The copolymer crystallized in runs 16–21 can also be solid stated in the same manner as the homopolymer, but of course, the resultant resin product comprises a copolymer of PEN/PET in the ratios used in the formation of the melt phase prepolymer.

Example 3

The crystallized and dried products obtained from runs 5–12 are subjected to solid state processing at a temperature of 240° C. to 260° C. under a blanket of countercurrent nitrogen gas for a period of time of up to 20 hours. Reaction by-products generated in the solid state reactor are swept away by countercurrent hot nitrogen gas. After this solid stating is performed the PEN homopolymer is suitable for use as a film, tire cord or packaging material.

Examples 1, 2 and 3 demonstrate that amorphous PEN homopolymer and copolymers can be crystallized under a positive pressure without expansion or deformation of the pellet during crystallization. Also, once the pellets are sufficiently crystallized, they will not expand or deform during a subsequent drying (Example 2) and SSP (Example 3). The minimum positive pressure required to prevent pellet expansion during crystallization is a direct function of the quantity of the volatile contents in the prepolymer (moisture content in particular) and the softening temperature (between 140° C. and 150° C. for PEN homopolymer and lower for a PEN copolymer). The minimum pressure required will increase with increasing volatile contents and polymer softening temperature.

What is claimed is:

1. A process for the crystallization of an amorphous polyethylene naphthalate prepolymer containing volatile components which comprises heating said prepolymer at a temperature within the range of about 200° C. above the Tg and about 10° C. below the Tm of the prepolymer under agitation and, at a pressure at least as high as the vapor pressure of said volatile components within said prepolymer, to produce a crystallized polyethylene naphthalate polymer.

2. The process of claim 1 wherein the prepolymer comprises a homopolymer.

3. The process of claim 1 wherein the prepolymer comprises a copolymer of polyethylene naphthalate (PEN) and polyethylene terephthalate (PET).

4. The process of claim 3 wherein the copolymer comprises 90% PEN and 10% PET.

5. The process of claim 1 wherein the pressure is provided by a gas comprising air, nitrogen or a combination thereof.

6. The process of claim 5 wherein the gas is a heated gas comprising from 4% to 21% oxygen.

7. The process of claim 1 wherein the prepolymer is prepared by the melt phase polymerization of ethylene glycol and 2,6- naphthalene dicarboxylic acid.

8. The process of claim 1 wherein the prepolymer is prepared by the melt phase polymerization of ethylene glycol and an ester of 2,6-naphthalene dicarboxylic acid.

9. The process of claim 1 wherein the prepolymer is heated at a temperature of 80° C. to 140° C. to partially devolitize the prepolymer prior to crystallization in the pressure range at least equal to the vapor pressure of the remaining volatile components in the prepolymer after partial devolitization.

10. A process for the solid state polymerization of a polyethylene naphthalate prepolymer which comprises heating said prepolymer at a temperature in the range of about 20° C. above the Tg and about 10° C. below the Tm of the prepolymer while agitating the prepolymer and in the presence of a pressure at least as great, or greater than, the vapor pressure of the volatile components contained in the prepolymer to produce a crystallized polyethylene naphthalate prepolymer and drying and then polymerizing said crystallized prepolymer under solid stating conditions at a temperature of from 50° C. to about 1° C. below the sticking temperature of the prepolymer for a period of time sufficient to produce a high molecular weight polyethylene naphthalate resin.

11. The process of claim 10 wherein the prepolymer comprises a homopolymer.

12. The process of claim 10 wherein the prepolymer comprises a copolymer of polyethylene terephthalate (PEN) and polyethylene naphthalate (PET).

13. The process of claim 12 wherein the copolymer comprises 90% PEN and 10% PET.

14. The process of claim 12 wherein the copolymer comprises from about 2% to about 98% PEN and from about 98% to about 2% PET.

15. The process of claim 10 wherein the pressure during crystallization is provided by the presence of an atmosphere comprising air, nitrogen or combinations thereof.

16. The process of claim 10 wherein the solid stating conditions comprise an atmosphere of nitrogen.

17. The process of claim 10 wherein the prepolymer is prepared by the melt phase polymerization of ethylene glycol and 2,6-naphthalene dicarboxylic acid or esters thereof.

18. A process wherein the prepolymer is heated to a temperature of 80° C. to 140° C. to partially devolitalize said volatile components in the prepolymer prior to crystallization as recited in claim 1.

19. The process of claim 18 wherein the volatile components in the prepolymer comprise water which vaporizes as the prepolymer is heated to a temperature at which the prepolymer begins to soften.

20. The process of claim 1 wherein the existing pressure during crystallization is equal to or greater than 15 psig and wherein the pressure is observed at a temperature of from about 20° C. above the Tg and about 10° C. below the Tm of the prepolymer.

21. The process of claim 10 wherein the pressure in the crystallization step is greater than 15 psig at 170° C.

22. The process of claim 20 wherein the crystallization pressure at a temperature is determined based on the total volatile content of the prepolymer and wherein, as the volatile content in the prepolymer increases, the crystallization pressure correspondingly increases.

23. The process of claim 10 wherein the crystallization pressure at a temperature is determined based on the total volatile content of the prepolymer and wherein, as the volatile content in the prepolymer decreases, the crystallization pressure decreases.

24. The process of claim 1 wherein the existing pressure during crystallization is equal to or greater than 20 psig and wherein the pressure is observed at a temperature of from about 20° C. above the Tg and about 10° C. below the Tm of the polymer.

* * * * *